(No Model.) 2 Sheets—Sheet 1.
B. WILLIAMS.
METHOD OF AND MEANS FOR JOINING SECTIONS OF CONDUITS FOR ELECTRIC CONDUCTORS.
No. 309,907. Patented Dec. 30, 1884.
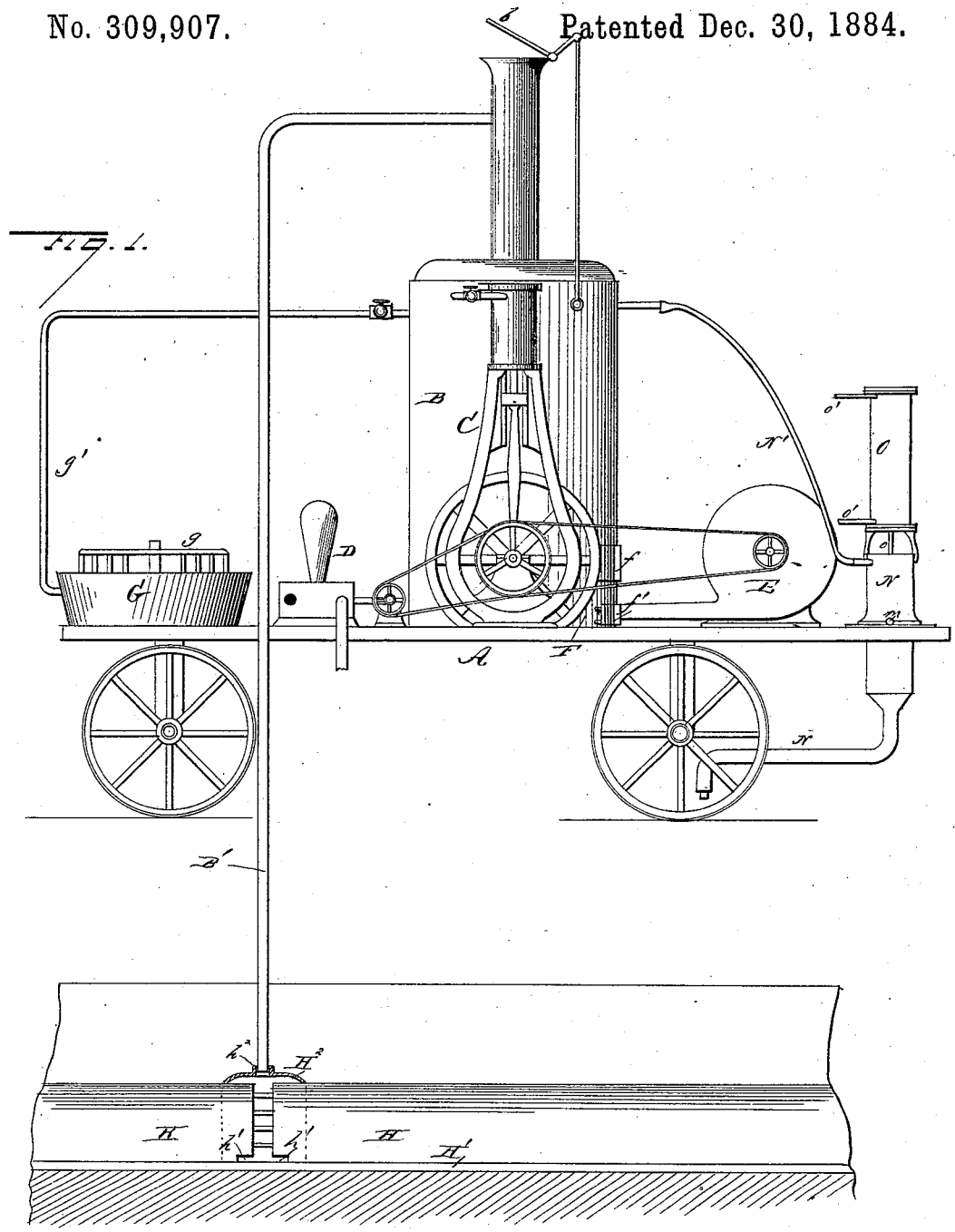

(No Model.) 2 Sheets—Sheet 2.
B. WILLIAMS.
METHOD OF AND MEANS FOR JOINING SECTIONS OF CONDUITS FOR ELECTRIC CONDUCTORS.
No. 309,907. Patented Dec. 30, 1884.
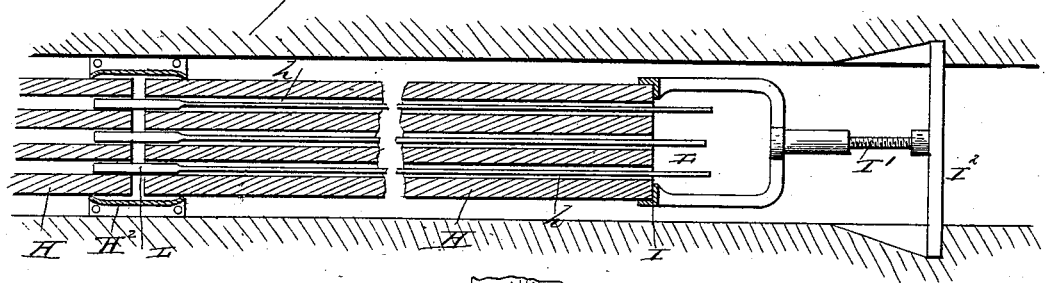
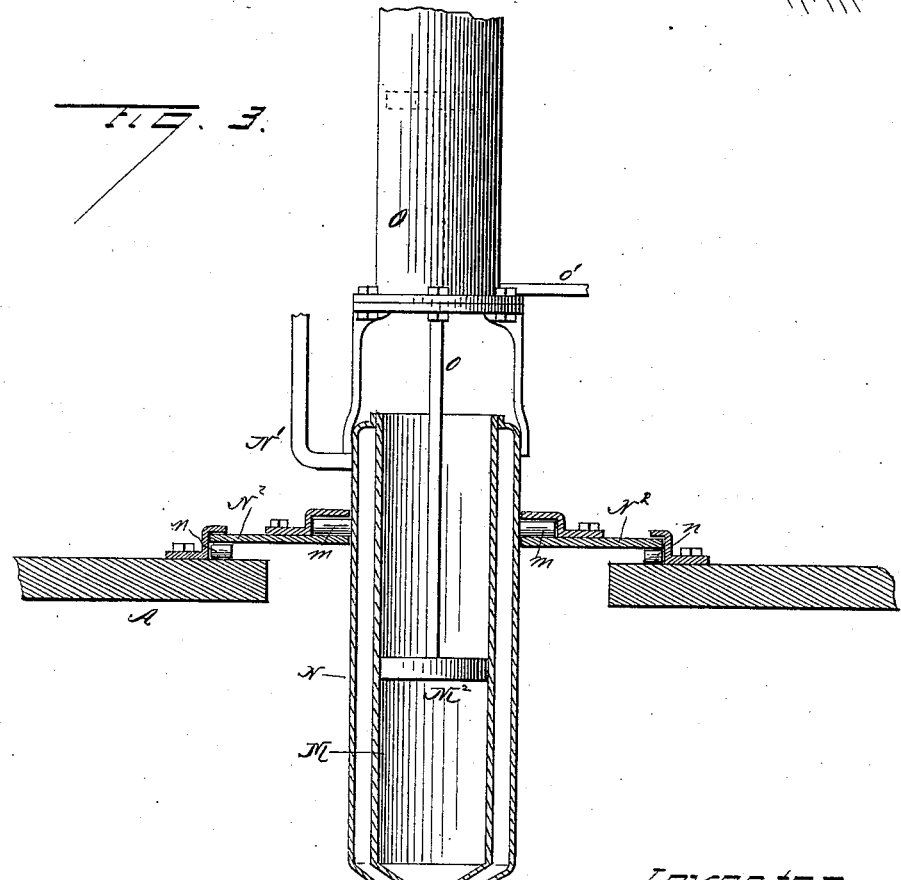
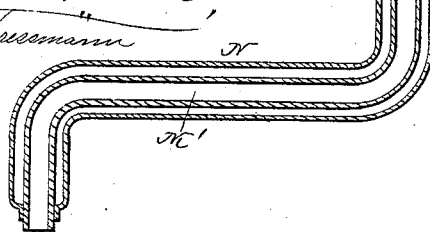

UNITED STATES PATENT OFFICE.

BENEZETTI WILLIAMS, OF CHICAGO, ILLINOIS.

METHOD OF AND MEANS FOR JOINING SECTIONS OF CONDUITS FOR ELECTRIC CONDUCTORS.

SPECIFICATION forming part of Letters Patent No. 309,907, dated December 30, 1884.

Application filed December 6, 1883. (No model.)

*To all whom it may concern:*

Be it known that I, BENEZETTI WILLIAMS, a citizen of the United States, residing at Chicago, in the county of Cook and State of Illinois, have invented certain new and useful Improvements in Methods of and Means for Joining Sections of Electrical Conduits, of which the following is a specification, to wit:

This invention relates to an improvement in the means for and method of joining the sections of conduits for electrical wires; and it consists in the method hereinafter described, and the means for carrying it into effect, substantially as will be more fully set forth and claimed.

In order to enable others skilled in the art to which my invention appertains to make and use the same, I will now proceed to describe it, referring to the accompanying drawings, in which—

Figure 1 is a view of a truck carrying the machinery for making the joint, shown in the act of heating the adjoining ends of two sections. Fig. 2 is a horizontal section of the conduit, showing the manner of holding the sections during the operation; and Fig. 3 is an enlarged section of the device for forcing in the joining material.

A represents a truck carrying a boiler, B, having a hinged cover or valve, $b$, at the end of its stack, a small engine, C, a pump, D, and a blower or fan, E, connected to the ash-pit of the furnace F, which is provided, also, with suitable doors, $f f'$, which are tightly closed when the boiler is in operation. Upon the truck A is also a steam-jacketed mixing-pan, G, having a stirrer, $g$, and its jacket connected with the boiler by means of a pipe, $g'$, as represented in Fig. 1.

As will be seen by reference to Figs. 1 and 2, the conduit is formed in sections H of a suitable length, of an asphaltum compound, having continuous wire cells or holes $h$ passing through them. The ends of each section are formed on the under side with a small undercut or notch, $h'$, and they are laid preferably on a plank or board, H', to which is secured a cap or form, $H^2$, covering the joint to be made, and provided with an opening, $h^2$, through which the operation is performed. The section is kept in position during the making of the joint by means of a flanged ring or band, I, placed on the end of the section, and provided with a jack-screw, I', the outer end of which abuts against a board or blank, $I^2$, secured across the cutting in which the conduit is laid.

To insure a continuous cell or wire-lead through the joint, I connect the two sections by means of headed rods L, passed in at the outer ends of the cells, and having their headed ends of a size with the cells, which they connect from one section to the other, and form cores over which the connection of the cells are formed, and which are easily withdrawn when the joint has been made. Upon the truck A is also carried a cylinder, M, open at its upper end, and having a pipe, M', connected to its lower end, which is of such form and size as to be readily connected to the cap or mold covering the joint. Both the cylinder and its pipe are provided with a jacket, N, connected by a steam-pipe, N', with the boiler. This cylinder and its jacket is supported on the truck upon trunnions $m$, journaled on an annular plate, $N^2$, turning freely upon rollers or wheels $n$ on the truck-frame, as fully shown in Fig. 3, by which means the cylinder is canted and the pipe turned to any position at the will of the operator.

Immediately above and supported upon the jacketed cylinder M is a second cylinder, O, containing a piston, as shown in dotted lines, which is connected by a rod, $o$, with a piston, $M^2$, working in the jacketed cylinder M. The cylinder O is provided with supply or exhaust pipes $o'$, by which steam may be admitted, if desired; but I prefer to connect it to the pump and use it as a hydraulic cylinder, as giving a more even and better-controlled motion to the pistons, which by this may be stopped at any point, while it could not so readily be done by the use of steam by reason of its expansion.

In making a joint in a conduit the sections are first properly placed in the cutting, the joint covered by the mold $H^2$, and the cells connected by the headed rods, as shown in Fig. 2. An asphaltum compound having been placed in the mixing-pan G and a fire started in the furnace, steam is caused to circulate through the jacket of the pan, and its heat reduces the compound to a plastic state necessary for operation. In the meantime the engine having been started and connected to the blower, by shutting the valve or cover $b$, the hot blast from the furnace is forced through the pipe B' from the stack to the mold H², and heats the adjacent ends of the sections, the blast and smoke being allowed to escape from the joint either through another opening in the mold or through the cells of the conduit, as may be found most desirable. When the ends of the conduit have been rendered sufficiently soft, the pipe B' is disconnected and the valve $b$ opened, to allow the draft to be passed through the stack direct, as usual, while the blower may also be stopped or not, as in the opinion of the operator is desirable in the condition of the steam and furnace. Steam is then turned onto the jacketed cylinder M, and its outlet-pipe M' connected to the mold H², in the same place and manner as the pipe B', already described, and the plastic material removed from the mixing-pan and placed in the jacketed cylinder, where it is kept sufficiently plastic by means of the steam circulating through its jacket. By means of the pump water is now forced into the cylinder O, and the descent of the piston forces the material into the joint, where it amalgamates with the softened ends of the sections and forms a continuous conduit having continuous cells or wire-leads. If desired, an endwise pressure may also be given the material while setting by means of the jack-screw, and the material, forced in under pressure, passes around and between the headed rods and beneath the undercut ends of the sections, and thus forms a perfect joint.

It will be observed that all the apparatus needed for forming these joints is carried compactly upon one truck or wagon; and although I have described specifically the means used, I do not wish to confine myself to the devices shown or their arrangement, it being evident that they may be varied without departing from the spirit of my invention.

Having thus fully described my invention, what I claim as new, and desire to secure by Letters Patent, is—

1. The method herein described of joining the sections of asphaltum-concrete conduits, consisting of first placing the sections in position and connecting their wire cells or leads, then forcing a hot-blast into the space between their ends to soften the material, then forcing into the joint, under pressure, a quantity of the same material in a plastic or liquid state, substantially as shown and described.

2. In an apparatus for making joints in sectional conduits formed of an asphaltum compound, a casing for covering the abutting ends of the sections and a core or series of cores connecting the wire-cells of the conduit, in combination with a furnace connected by a pipe to the casing, and a blower or equivalent device for producing a hot-blast and projecting it into the joint, whereby the ends of the sections are softened, substantially as shown and described.

3. In an apparatus for making joints in sectional conduits formed of an asphaltum compound, a mold or casing covering the abutting ends of the sections and a core or series of cores connecting the wire-cells of the conduit, in combination with a cylinder having an escape-pipe adapted to be connected to the casing, a jacket surrounding both the cylinder and its escape-pipe, through which a heating agent is circulated while in use, and a piston within the cylinder, whereby the plastic material is forced into the joint under pressure, substantially as shown and described.

4. In an apparatus for joining the sections of an asphaltum-concrete conduit, means, substantially as shown, for forcing the joining material between the adjacent ends of the conduit-sections, heated and under pressure, in combination with means, substantially as described, for retaining the sections in place during the operation, and giving the last section an endwise pressure after the material is forced in, whereby the joint is made of the same density as the other portions of the conduit, as herein specified.

5. In an apparatus for forcing plastic material between the adjacent ends of the sections of an asphaltum-concrete conduit during the operation of joining them, a steam-jacketed cylinder having a steam-jacketed escape-pipe, and adapted to have both a swinging and rotary motion in its supporting-frame, in combination with a steam or hydraulic cylinder secured above and in line with the first, and having its piston connected to an expressing-piston in the former, and means for feeding steam or water to the second cylinder, substantially as and for the purpose set forth.

6. In an apparatus for forming joints between the sections of an asphaltum-concrete conduit, a mixing-pan for containing the material for forming the joints, provided with a jacket through which steam is caused to circulate, in combination with a steam-generating device and a device for stirring the material while being heated, substantially as shown and described.

7. The combination, with the sections of an asphaltum-concrete conduit, having their adjacent ends covered by a forming-mold, and their wire-cells connected by headed rods, of a truck provided with means for heating and rendering plastic the joining material, means for forcing a hot-blast into the joint to soften its walls, means for forcing the plastic material into the joint under pressure, and means for giving the last section laid an endwise pressure during and after the making of the joint, substantially as shown and described.

In testimony whereof I affix my signature in presence of two witnesses.

BENEZETTI WILLIAMS.

Witnesses:
W. C. McArthur,
F. Johnson.